United States Patent [19]

Ingalls

[11] Patent Number: 4,836,574
[45] Date of Patent: Jun. 6, 1989

[54] ASSSEMBLY FOR ADJUSTING WHEEL ALIGNMENT, AND METHOD

[75] Inventor: William E. Ingalls, Longmont, Colo.

[73] Assignee: Thomas W. O'Rourke, Boulder, Colo. ; a part interest

[21] Appl. No.: 167,775

[22] Filed: Mar. 14, 1988

[51] Int. Cl.[4] .............................................. B62D 17/00
[52] U.S. Cl. .................................... 280/661; 280/674; 403/161
[58] Field of Search ........................ 280/661, 674, 688; 403/161; 72/704

[56] References Cited

U.S. PATENT DOCUMENTS

| | | | |
|---|---|---|---|
| 3,294,413 | 12/1966 | Jurosek et al. | 280/96.1 |
| 4,231,588 | 11/1980 | Wotton et al. | 280/661 |
| 4,252,338 | 2/1981 | Ingalls et al. | 280/661 |
| 4,332,397 | 6/1982 | Steger | 280/674 |
| 4,613,251 | 9/1986 | Bellamy et al. | 280/674 |

*Primary Examiner*—Richard A. Bertsch
*Attorney, Agent, or Firm*—Robert E. Harris

[57] ABSTRACT

A structure and method for adjusting alignment of steerable wheels movable supported by a ball joint with a ball joint stud having an annual tilt bearing surface carried thereon, the structure comprising a bore defined in a suspension member and configured to receive the ball joint stud therein, the bore being larger than the ball joint stud and including therein a concave bearing surface in the form of a truncated sphere, the ball joint annular tilt bearing having a convex surface shaped to fit the spherical portion of the bore bearing surface, and a wedge washer proportioned to fit adjacent a ball joint nut, alignment being obtained by placing the tilt bearing on the ball joint stud bearing movable in the concave portion of the bore bearing surface, and positioning a wedge washer on the proper angle in the proper orientation to incline the ball joint stud as required for proper alignment. Orientation is determined by the position and angle of the wedge washer. The concave and convex bearing surfaces may be defined in discrete components.

10 Claims, 2 Drawing Sheets

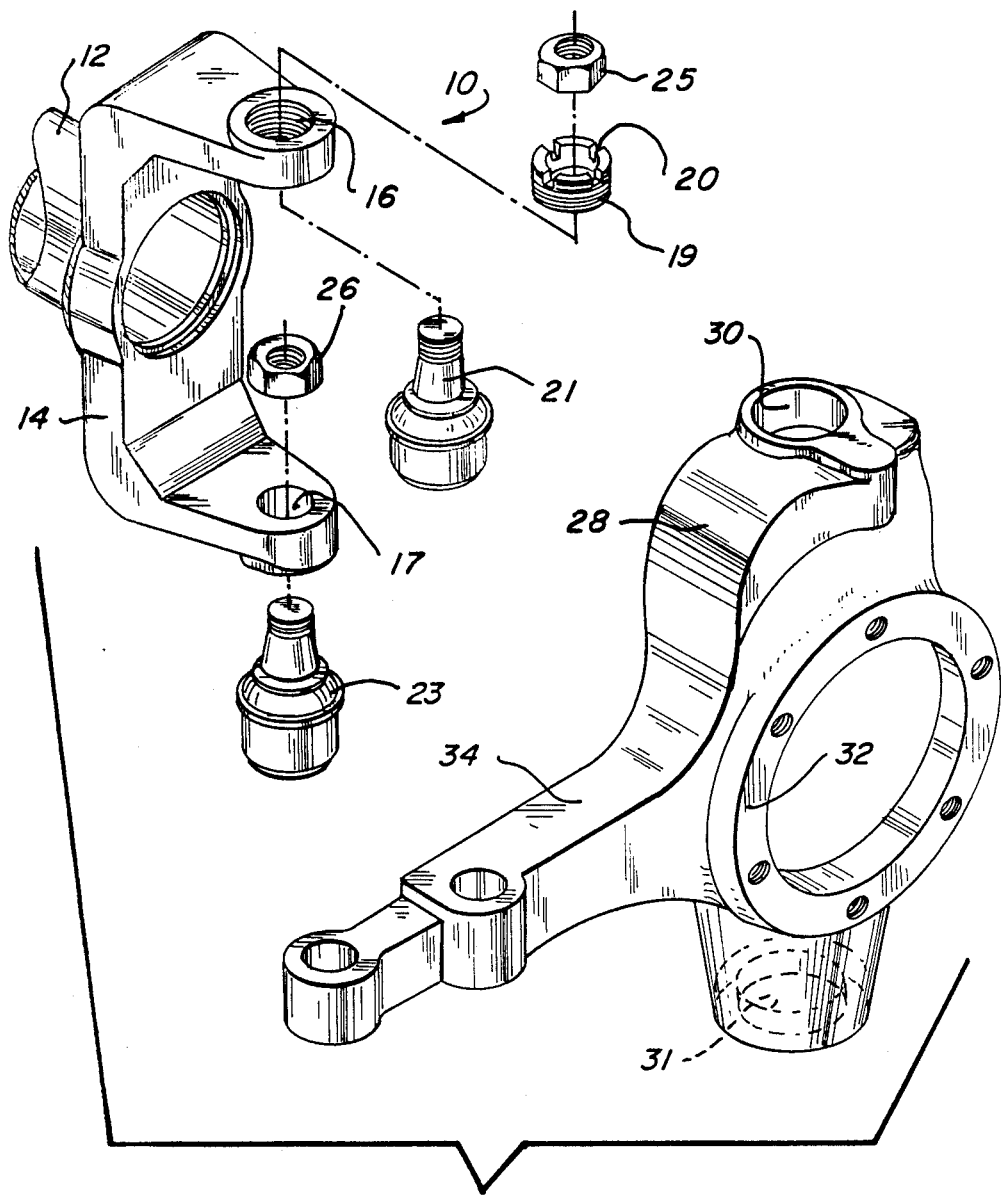
Fig_1
PRIOR ART

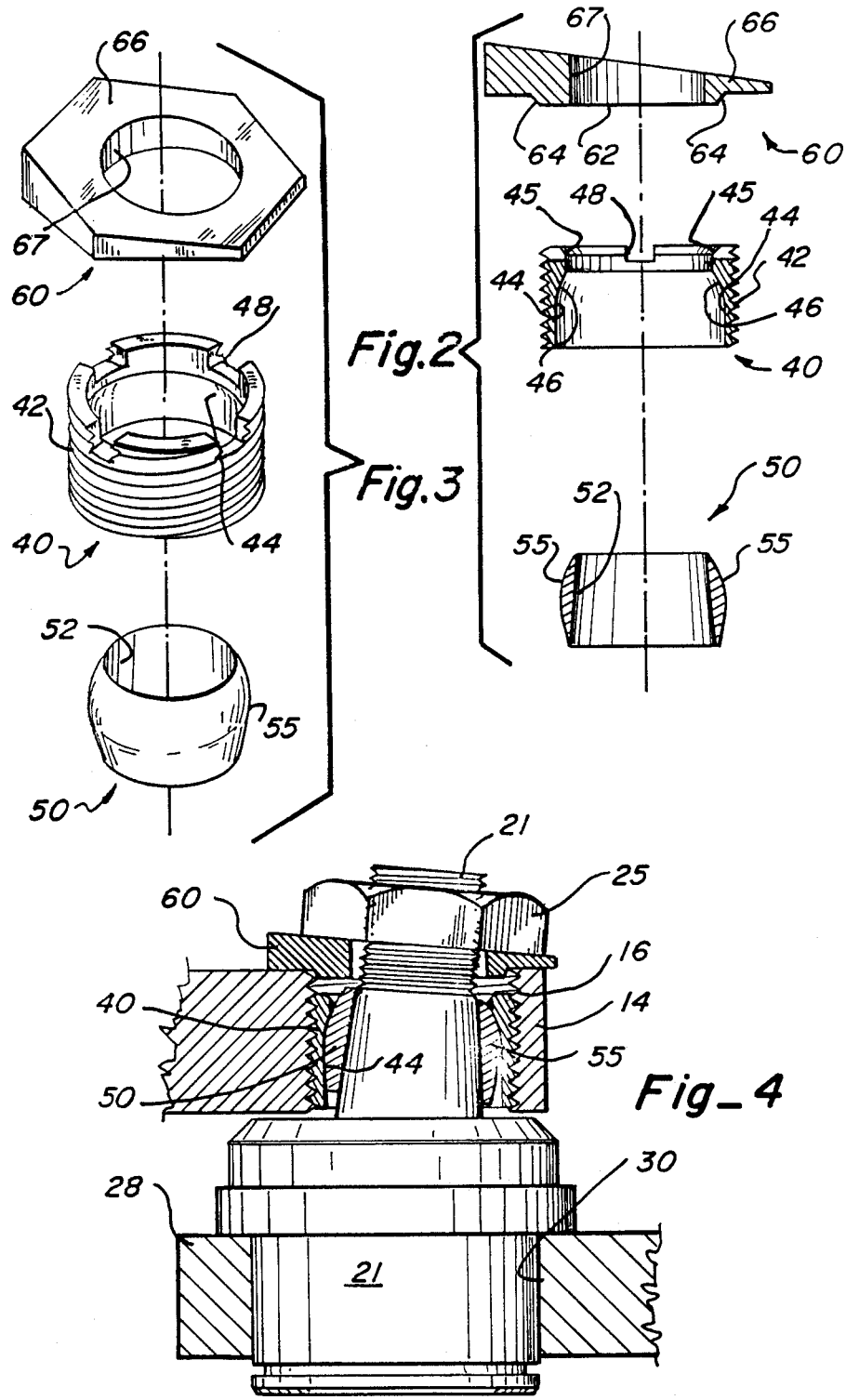

4,836,574

ASSSEMBLY FOR ADJUSTING WHEEL ALIGNMENT, AND METHOD

FIELD OF THE INVENTION

This invention relates generally to vehicles having steerable wheels carried on at least one ball joint and ball joint stud, and more particularly to an improved method and assembly for correcting the alignment settings of the steerable wheels of such vehicles.

BACKGROUND OF THE INVENTION

Alignment adjustment at the ball joint has been a desirable but difficult exercise. When the ball joint is carried in the spindle, caster, camber and steering angle (king-pin inclination) can be changed. Reversal of these mountings limits adjustment to camber since the actual pivot locations are fixed. Though not limited to such uses, most ball joint adjustment is to be found in rigid axle, usually four-wheel drive, vehicles.

Perhaps the most widely utilized example of such devices is that described in my U.S. Pat. No. 4,252,338. In this arrangement, a conventional, symmetrical ball joint bushing is removed and replaced with an offset and/or skewed bushing. The bushing is located with the offset oriented in a direction determined by the required alignment correction. Since the bushing is usually threaded, the depth of mounting of the bushing is controllable only to a portion of the thread pitch. Accordingly, ball joint preloaded, which is a function of the bushing position, is not precisely controllable. Instead, the bushing position is determined by alignment rather than preload consideration.

U.S. Pat. No. 4,231,588 discusses a structure using a socket portion fitted in a spindle which receives an outer sleeve which in turn both complementary fits the socket and fits the tapered ball joint stud. Thus, when the ball joint nut is secured on the stud, it bears upon the sleeve and pulls the stud into the sleeve. The tapered shape of the stud expands the sleeve to cause it to seize the socket and lock the structure. By way of drawbacks, the structure requires the alignment to be maintained in an unsteady manner as the nut is tightened, and the "locking" is by friction between two spherical surfaces, one concave and one convex. Such locking is at best marginal in view of the loads carried through the structure.

SUMMARY OF THE INVENTION

The present invention relates to an improved vehicle alignment assembly and method in which, in terms of structure such as that described in U.S. Pat. No. 4,252,338, a ball joint bushing is replaced by an annular insert member with a concave bearing surface at one end of the bore, a tilt bearing having a complementary convex bearing surface is installed on the ball joint stud and a washer with a selected wedge is positioned under the stud nut. The insert member and tilt bearing locate the ball joint stud but permit angular movement. The wedge washer determines the angular position, or tilt, of the stud.

In the instance of an original design as opposed to the above-described retrofit, the convex and concave bearing surfaces can be provided directly on the ball joint stud and suspension member bore, respectively.

BRIEF DESCRIPTION OF THE DRAWINGS

The accompanying drawings illustrate a complete embodiment of the invention according to the best mode so far devised for the practical application of the principles thereof, and in which:

FIG. 1 is an exploded, perspective view of a typical solid axle, yoke and steering knuckle arrangement including ball joints according to the prior art;

FIG. 2 is a sectioned side view of an alignment assembly of the present invention shown on a ghosted ball joint;

FIG. 3 is an exploded view of the components shown in FIG. 2; and

FIG. 4 is a partially sectioned view of the alignment assembly of FIG. 2 shown installed in the yoke of FIG. 1.

DESCRIPTION OF THE INVENTION

Turning now to the drawings, wherein similar elements are designated by like reference numerals throughout the various figures, a prior art steering assembly to which the instant invention pertains is illustrated in FIG. 1 and generally designated by reference numeral 10. It is to be understood that the assembly shown is merely typical, but not definitive of such assemblies. As shown in FIG. 1, steering assembly 10 includes axle housing 12, which, as illustrated, is hollow and adapted to enclose a driving axle (not shown) for a four-wheel drive vehicle, but for the purposes of illustration is essentially equivalent to a solid axle. Yoke 14 is rigidly mounted to axle housing 12 and carries upper ball joint housing 16 and lower ball joint housing 17.

Upper ball joint housing 16 is enlarged and threaded to receive bushing 19, which includes slots 20 which receive a tool (not shown) to assist in engaging the threads of bushing 19 with the threads of upper ball joint housing 16 by rotation. As illustrated, lower ball joint housing 17 is a tapered opening, but optionally could be of a structure similar to that of upper ball joint housing 16 in order that a bushing could also be threaded therein. Upper ball joint 21 fits within the tapered portion thereof in the tapered interior opening of bushing 19 while lower ball joint 23 engages lower ball joint housing 17 with the tapered portion of lower 23 engaging the tapered portion of lower ball joint housing 17 defined directly in yoke 14. Nuts 25 and 26 may be threaded onto the complementary threaded studs of ball joints 21 and 23 to secure the ball joints in yoke 14.

The structure of ball joints is of course well known. Ball joints 21 and 23 include a ball journaled in a housing and having a threaded and tapered stud extending therefrom. The housing of upper ball joint 21 is secured to steering knuckle 28 at support opening 30. Lower ball joint 23 is similarly secured to steering knuckle 28 at lower ball joint support 31 as shown in FIG. 1.

Steering knuckle 28 includes spindle pad 32 and steering arm 34 to, respectively, mount a spindle (not shown) thereto, and to provide for movement of steering knuckle 28 relative to yoke 14 for vehicle steering. Other related suspension and steering structure is well known to those skilled in the art and thus will not be presented in unnecessary detail here.

As shown in FIGS. 2 and 3, insert member 40 according to the instant invention includes a threaded outer surface 42, an enlarged inner bore 44 chamber 45, and bearing surface 46 preferably in the form of a concave truncated sphere. Openings 48 are defined in the end surface of insert member 40 to facilitate installation using a complementary wrench (not shown). Tilt bearing 50 is formed with a tapered inner channel 52 which fits the ball joint stud taper, and a convex bearing surface 55 complementary to concave bearing surface 46. Finally, wedge washer 60 includes bottom surface 62, locating ridge 64, angled upper surface 66 and hole 67 extending normal to angled surface 66 and shaped to receive the ball joint stud.

Operation of the alignment assembly will be more readily understood with reference to FIG. 4. As shown, ball joint 21 is carried in steering knuckle 28 by a press fit at opening 30. Insert member 40 is threaded into yoke 14 and tilt bearing 50 is supported on the tapered stud of ball joint 21. Thus concave bearing surface 46 of insert member 40 engages convex bearing surface 55 of tilt bearing 50 to position and locate the stud portion of ball joint 21 while allowing angular movement thereof. However, wedge wash 60 below ball joint nut 25 angularly positions the ball joint stud as a result of the angled upper and lower surfaces.

Insert member 40 may be positioned at any depth within upper ball joint housing 16 to accommodate the desired ball joint preload. Appropriate amounts of adjustment can be accomplished by selecting a wedge washer 60 with the proper angle between the upper and lower surfaces. Also, wedge wash 60 may be positioned with the wedge perpendicular to the axle to adjust caster, or parallel to the axle to adjust camber, or in between to adjust both concurrently.

While not required, it is often desirable to longitudinally split insert member 40. This enables the ball joint stud to more easily expand the insert member 40 to preclude movement. But it is apparent from the above discussion that the alignment is positively located by the wedge washer 60.

Only preferred forms and embodiments of the invention have been described in detail. However, numerous variations will be apparent to those skilled in the art. For instance, the concave bearing surface could clearly be formed within the ball joint housing bore thereby obviating the need for a separate insert member. In a similar manner, the convex tilt bearing could be formed directly on the ball joint stud. Such changes and modifications are intended to be within the scope of the invention as defined by the following claims.

What is claimed is:

1. In a vehicle suspension assembly for supporting a movable suspension member to a fixed suspension member by means of a ball joint having a base portion and a ball joint stud threaded at the end thereof, the ball joint base being carried in a first of the suspension members and the ball joint stud extending through a hole defined in the second of the suspension members with the thread portion extending beyond the hole and carrying a ball joint nut, the improvement comprising:
   a tilt bearing surface defined circumferentially around the ball joint stud;
   a tilt bearing receiving surface defined in the suspension member hole and configured to engage the tilt bearing surface to form a journalled interface therewith; and
   a wedge washer having opposed nonparallel faces and an opening defined therethrough, the wedge washer being positioned around the ball joint stud and interposed between the ball joint nut bearing on one face and the surface of the second suspension member adjacent the hole therethrough;
   whereby the ball joint stud is free to rotate at the journal between the tilt bearing surface on the ball joint stud and the tilt bearing receiving surface defined in the second suspension member receiving hole, but confined to a preselected position determined by the angle between the opposed faces of the wedge washer.

2. A vehicle suspension assembly as set forth in claim 1 in which the tilt bearing surface is convex and curved, and the tilt bearing receiving surface is of a complementary concave, curved shape.

3. A vehicle suspension assembly as set forth in claim 2 in which the curved surfaces of the tilt bearing and the tilt bearing receiving surface are at least partially spherical in cross section.

4. A vehicle suspension assembly as set forth in claim 1 in which the ball joint stud is tapered along its length and the tilt bearing is defined on the outer surface of a discrete annular component having an inner channel shaped to fit onto the ball joint stud.

5. A vehicle suspension assembly as set forth in claim 1 in which the tilt bearing receiving surface is defined within a cylindrical insert component positioned within the hole defined in the second suspension member, the inner opening of the insert being larger than the adjacent ball joint stud except at the tilt bearing portion of the ball joint stud.

6. A vehicle suspension assembly as set forth in claim 5 in which the hole in the second suspension member and the outer surface of the insert are threaded.

7. In a vehicle suspension assembly for supporting a movable suspension member to a fixed suspension member by a ball joint having a base portion and a ball joint stud threaded at at least the end portion thereof, the ball joint base being attached to one of the suspension members and the ball joint stud extending through a hole defined through the other suspension member and secured thereto by a ball joint nut threaded onto the threaded portion of the ball joint stud, the improvement comprising:
   an annular ring member positioned on the ball joint stud and having a tilt bearing surface defined circumferentially around the outer surface of the ring member;
   a cylindrical insert positioned in the suspension member hole and having a tilt bearing receiving surface defined circumferentially around the inner insert surface, the inner insert surface being spaced from the adjacent ball joint except at the journalled interface between the tilt bearing and the tilt bearing receiving surface; and
   a wedge washer having opposed, angled faces defined thereon and an opening defined therethrough, the wedge member being positioned around the ball joint stud and between the ball joint nut and the suspension member having the hole therethrough to fix the angle of the ball joint stud in the suspension hole as a function of the angle between the wedge washer faces.

8. A vehicle suspension assembly as set forth in claim 7 in which the outer surface of the cylindrical insert and the suspension member hole are threaded.

9. A method for adjusting the alignment of a first vehicle suspension member attached to a second suspension member by a ball joint having a base secured to one of the suspension members and a ball joint stud with a threaded end portion extending through a hole through the other suspension member with the ball joint stud being journalled for tilting movement in the hole by a tilt bearing defined circumferentially around the ball joint stud and a tilt bearing receiving surface defined circumferentially around the suspension member hole, the method comprising:

tilting the ball joint stud within the suspension member hole to obtain the desired alignment;

positioning a wedge washer having opposed angled faces appropriate to maintain the desired tilt of the ball joint stud around the end portion of the ball joint stud extending from the suspension member hole; and securing the desired tilt of the ball joint stud in the suspension member hole by threading a nut onto the threaded portion of the ball joint stud to bear upon the wedge washer.

10. A method as set forth in claim 9 in which the alignment of the suspension members is changed by removing the nut and the first wedge washer having opposed faces at a first angle, replacing the first wedge washer with a second wedge washer having opposed faces at a differing angle than that of the first wedge washer, and replacing the nut to bear upon the second wedge washer to change the tilt angle of the ball joint stud in the suspension member hole as a function of the change in the angle of the opposed faces of the first and second wedge washers.

* * * * *